(12) United States Patent
Kremin et al.

(10) Patent No.: US 10,037,092 B2
(45) Date of Patent: *Jul. 31, 2018

(54) STYLUS TO HOST SYNCHRONIZATION

(71) Applicant: Wacom Co., Ltd., Saitama (JP)

(72) Inventors: Viktor Kremin, Lviv (UA); Andriy Ryshtun, Lviv (UA); David Wright, San Diego, CA (US); Jeff M. Boschee, San Jose, CA (US)

(73) Assignee: Wacom Co., Ltd., Saitama (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/096,002

(22) Filed: Apr. 11, 2016

(65) Prior Publication Data

US 2016/0224135 A1    Aug. 4, 2016

Related U.S. Application Data

(63) Continuation of application No. 13/431,832, filed on Mar. 27, 2012.

(60) Provisional application No. 61/599,332, filed on Feb. 15, 2012.

(51) Int. Cl.
    *G06F 3/033*      (2013.01)
    *G06F 3/038*      (2013.01)
    *G06F 3/044*      (2006.01)
    *G06F 3/041*      (2006.01)
    *G06F 3/0354*      (2013.01)
    *G06F 1/32*      (2006.01)

(52) U.S. Cl.
CPC .......... *G06F 3/0383* (2013.01); *G06F 1/3215* (2013.01); *G06F 1/3259* (2013.01); *G06F 3/03545* (2013.01); *G06F 3/03547* (2013.01); *G06F 3/044* (2013.01); *G06F 3/0416* (2013.01); *G06F 2203/04104* (2013.01); *G06F 2203/04106* (2013.01)

(58) Field of Classification Search
CPC .. G06F 3/03545; G06F 3/0354; G06F 3/0416; G06F 3/044; G06F 2203/04104; G06F 3/046

See application file for complete search history.

(56) References Cited

U.S. PATENT DOCUMENTS

| | | |
|---|---|---|
| 4,686,332 A | 8/1987 | Greanias et al. |
| 5,117,071 A | 5/1992 | Greanias et al. |
| 5,386,219 A | 1/1995 | Greanias et al. |

(Continued)

FOREIGN PATENT DOCUMENTS

| | | |
|---|---|---|
| GB | 2462170 A | 2/2010 |
| JP | 2009-187076 A | 8/2009 |

OTHER PUBLICATIONS

International Search Report for PCT/US2012/52923 dated Nov. 6, 2012, 2 pages.

(Continued)

*Primary Examiner* — Priyank Shah
(74) *Attorney, Agent, or Firm* — Seed IP Law Group LLP

(57) ABSTRACT

A system and method for synchronizing a stylus to a capacitive sense array. The system including a capacitive sense array which includes a plurality of electrodes. A synchronization signal is transmitted to the stylus using the plurality of electrodes. The synchronization signal is transmitted to the stylus by capacitively coupling the stylus to the capacitive sense array.

17 Claims, 10 Drawing Sheets

(56) References Cited

U.S. PATENT DOCUMENTS

| | | | |
|---|---|---|---|
| 5,414,227 A * | 5/1995 | Schubert | G06F 3/046 178/19.01 |
| 6,002,387 A | 12/1999 | Ronkka et al. | |
| 6,081,261 A | 6/2000 | Wolff et al. | |
| 6,441,810 B1 | 8/2002 | Skoog et al. | |
| 6,690,156 B1 * | 2/2004 | Weiner | G01S 5/02 273/237 |
| RE39,881 E | 10/2007 | Flowers | |
| 7,372,455 B2 * | 5/2008 | Perski | G06F 3/041 345/173 |
| 7,552,861 B2 | 6/2009 | Chen et al. | |
| 7,557,939 B2 | 7/2009 | Marggraff et al. | |
| 7,612,767 B1 | 11/2009 | Griffin et al. | |
| 7,812,268 B2 | 10/2010 | Ely | |
| 8,400,427 B2 | 3/2013 | Perski et al. | |
| 2003/0016210 A1 * | 1/2003 | Soto | G01S 5/02 345/173 |
| 2004/0021463 A1 | 2/2004 | Miyazawa et al. | |
| 2004/0095333 A1 | 5/2004 | Morag et al. | |
| 2005/0110778 A1 * | 5/2005 | Ben Ayed | G06F 3/03545 345/179 |
| 2005/0162411 A1 | 7/2005 | Berkel van | |
| 2006/0012581 A1 | 1/2006 | Haim et al. | |
| 2007/0085836 A1 * | 4/2007 | Ely | G06F 3/03545 345/173 |
| 2007/0171211 A1 * | 7/2007 | Perski | G06F 3/041 345/173 |
| 2008/0023232 A1 | 1/2008 | Morag et al. | |
| 2008/0055279 A1 | 3/2008 | Osada et al. | |
| 2008/0106520 A1 | 5/2008 | Free et al. | |
| 2008/0128180 A1 | 6/2008 | Perski et al. | |
| 2008/0149401 A1 | 6/2008 | Hagen et al. | |
| 2008/0149402 A1 | 6/2008 | Vos | |
| 2008/0150550 A1 | 6/2008 | Vos | |
| 2008/0150658 A1 | 6/2008 | Vos | |
| 2008/0150916 A1 | 6/2008 | Vos | |
| 2008/0150917 A1 | 6/2008 | Libbey et al. | |
| 2008/0150918 A1 * | 6/2008 | Hagen | G06F 3/046 345/179 |
| 2008/0156546 A1 | 7/2008 | Hauck | |
| 2008/0158165 A1 | 7/2008 | Geaghan et al. | |
| 2008/0316669 A1 | 12/2008 | May | |
| 2009/0078476 A1 * | 3/2009 | Rimon | G06F 3/03545 178/18.03 |
| 2009/0256825 A1 | 10/2009 | Klinghult et al. | |
| 2010/0066693 A1 | 3/2010 | Sato et al. | |
| 2010/0073323 A1 | 3/2010 | Geaghan | |
| 2010/0085325 A1 * | 4/2010 | King-Smith | G06F 3/03545 345/174 |
| 2010/0155153 A1 | 6/2010 | Zachut | |
| 2010/0170726 A1 | 7/2010 | Yeh et al. | |
| 2010/0220062 A1 | 9/2010 | Antila | |
| 2010/0252335 A1 | 10/2010 | Orsley | |
| 2010/0265189 A1 | 10/2010 | Rofougaran | |
| 2011/0084846 A1 | 4/2011 | Li et al. | |
| 2011/0090146 A1 | 4/2011 | Katsurahira | |
| 2011/0122087 A1 | 5/2011 | Jang et al. | |
| 2011/0162894 A1 | 7/2011 | Weber | |
| 2011/0169775 A1 | 7/2011 | Liaw et al. | |
| 2011/0267311 A1 | 11/2011 | Yeh | |
| 2012/0013555 A1 | 1/2012 | Maeda et al. | |
| 2012/0050207 A1 * | 3/2012 | Westhues | G06F 3/03545 345/174 |
| 2012/0062497 A1 | 3/2012 | Rebeschi et al. | |
| 2012/0068964 A1 | 3/2012 | Wright et al. | |
| 2012/0105361 A1 | 5/2012 | Kremin et al. | |
| 2012/0327041 A1 | 12/2012 | Harley et al. | |
| 2013/0106722 A1 * | 5/2013 | Shahparnia | G06F 3/03545 345/173 |
| 2013/0106760 A1 | 5/2013 | Pedersen et al. | |
| 2013/0207938 A1 | 8/2013 | Ryshtun et al. | |
| 2013/0207939 A1 | 8/2013 | Kremin et al. | |

OTHER PUBLICATIONS

International Search Report for PCT/US2012/53471 dated Nov. 16, 2012, 2 pages.
Written Opinion of the International Searching Authority for PCT/US2012/52923, dated Nov. 6, 2012, 4 pages.
Written Opinion of the International Searching Authority for PCT/US2012/53471, dated Nov. 16, 2012, 4 pages.
Anusha Withana et al., "ImpAct: Immersive Haptic Stylus to Enable Direct Touch and Manipulation for Surface Computing," Computers in Entertainment (CIE), vol. 9 Issue 2 Article 9, Dec. 2010.
Juan Wang et al., "Clock Recovery and Audio/Video Synchronizxation in Digital TV System," China Cable Television, Nov. 2004, 3 pages.
Juan-Yao Ruan et al., "A Multi-Touch Interface Circuit for a Large-Sized Capacitive Touch Panel," IEEE Sensors 2010 Conference, 978-1-4244-8168-2/10, 6 pages.
Search Report for U.S. Appl. No. 13/431,832, dated Mar. 2010, 10 pages.
Non-Final Office Action, dated Jun. 21, 2016, for corresponding U.S. Appl. No. 15/097,096, 15 pages.

* cited by examiner

STYLUS TO HOST SYNCHRONIZATION

CROSS-REFERENCE TO RELATED APPLICATIONS

This application claims the benefit of U.S. Provisional Application No. 61/599,332, filed on Feb. 15, 2012, the contents of which are hereby incorporated by reference herein.

BACKGROUND

Technical Field

This disclosure relates to the field of user interface devices and, in particular, to capacitive sensor devices.

Description of the Related Art

The use of a stylus with a touch screen interface is well established. Touchscreen designs have incorporated many different technologies including resistive, capacitive, inductive, and radio frequency sensing arrays. Resistive touch screens, for example, are passive devices well suited for use with a passive stylus. The original PalmPilots® devices from the mid-1990s were one of the first successful commercial devices to utilize a resistive touch screen designed for use with a stylus and helped to popularize that technology. Although resistive touch screens can sense the input from nearly any object, multi-touch is generally not supported. An example of a multi-touch application may be applying two or more fingers to the touch screen. Another example may be inputting a signature, which may include simultaneous palm and stylus input signals. Due to these and other numerous disadvantages, capacitive touch screens are increasingly replacing resistive touch screens in the consumer marketplace.

Various tethered active stylus approaches have been implemented for use with touch screens and are found in many consumer applications such as point-of-sale terminals (e.g., the signature pad used for credit card transactions in retail stores) and other public uses.

BRIEF DESCRIPTION OF THE SEVERAL VIEWS OF THE DRAWINGS

The present invention is illustrated by way of example, and not of limitation, in the figures of the accompanying drawings in which.

DETAILED DESCRIPTION

In the following description, for purposes of explanation, numerous specific details are set forth in order to provide a thorough understanding of the present invention. It will be evident, however, to one skilled in the art that the present invention may be practiced without these specific details. In other instances, well-known circuits, structures, and techniques are not shown in detail, but rather in a block diagram in order to avoid unnecessarily obscuring an understanding of this description. Thus, the specific details set forth are merely exemplary. Particular implementations may vary from these exemplary details and still be contemplated to be within the scope of the present invention. Reference in the description to "one embodiment" or "an embodiment" means that a particular feature, structure, or characteristic described in connection with the embodiment is included in at least one embodiment of the invention. The phrase "in one embodiment" located in various places in this description does not necessarily refer to the same embodiment.

Apparatuses and methods of synchronizing a stylus to a capacitive sense array are described. In one embodiment, the capacitive sense array is configured to transmit a synchronization signal to the stylus. A processing device provides a synchronization signal to synchronize the capacitive sense array and the stylus. One or more of the electrodes in the capacitive sense array may be used to capacitively couple the synchronization signal to the stylus. The one or more electrodes in the capacitive sense array may also be used to transmit a host transmit (TX) signal. In one embodiment, the host TX signal and the synchronization signal may be transmitted simultaneously (e.g., there is an overlap in the time period in which the host TX signal is transmitted and the time period in which the synchronization signal is transmitted). In another embodiment, the host TX signal and the synchronization signal may have different frequencies (e.g., host TX signal may have higher or lower frequency than synchronization signal or vice versa). In one embodiment, the stylus may detect, listen or scan for the host TX signal and may synchronize its operation to the time intervals (e.g., gaps) between the transmissions of the host TX signal. The stylus may transmit a stylus TX signal in the gaps between the transmission of the host TX signal.

Figure 1:
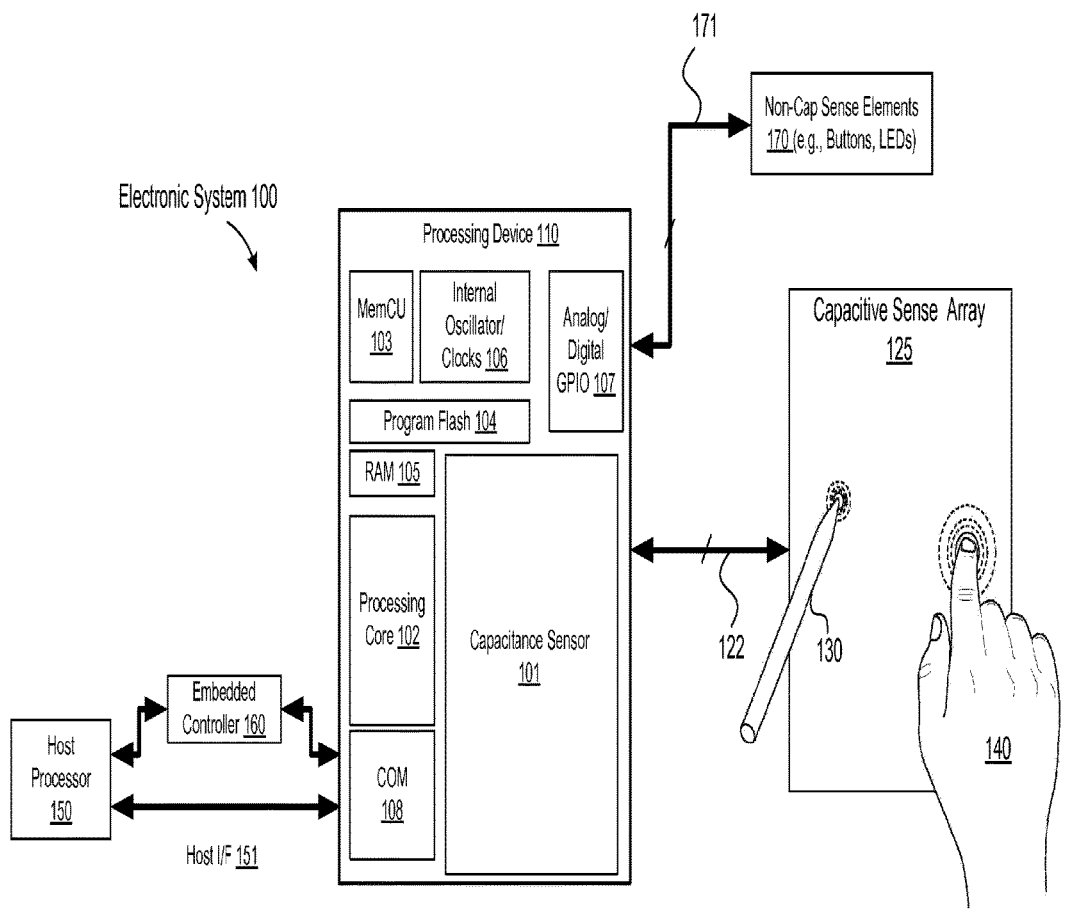
FIG. 1 is a block diagram illustrating one embodiment of an electronic system having a processing device for detecting a presence of a touch object and a stylus.

FIG. 1 is a block diagram illustrating one embodiment of an electronic system 100 having a processing device 110 for detecting a presence of a touch object 140 and a stylus 130. Electronic system 100 includes processing device 110, capacitive sense array 125, stylus 130, host processor 150, embedded controller 160, and non-capacitive sense elements 170. In the depicted embodiment, the electronic system 100 includes the capacitive sense array 125 coupled to the processing device 110 via bus 122. The capacitive sense array 125 may include a multi-dimension capacitive sense array. The multi-dimension sense array includes multiple sense elements, organized as rows and columns. In another embodiment, the capacitive sense array 125 operates as an all-points-addressable ("APA") mutual capacitive sense array. In another embodiment, the capacitive sense array 125 operates as a coupled-charge receiver. Alternatively, other configurations of capacitive sense arrays may be used. In one embodiment, the capacitive sense array 125 may be included in an ITO panel or a touch screen panel.

The operations and configurations of the processing device 110 and the capacitive sense array 125 for detecting and tracking the touch object 140 and stylus 130 are described herein. In short, the processing device 110 is configured to detect a presence of the active stylus 130 on the capacitive sense array 125, as well as a presence of the touch object 140. The processing device 110 may detect and track the active stylus 130 and the touch object 140 individually on the capacitive sense array 125. In one embodiment, the processing device 110 can detect and track both the active stylus 130 and touch object 140 concurrently on the capacitive sense array 125. In one embodiment, the processing device 110 is configured to operate as the timing "master," and the active stylus 130 adjusts its timing to match that of the processing device 110 when the active stylus 130 is in use. In one embodiment, the capacitive sense array 125 capacitively couples with the active stylus 130, as opposed to conventional inductive stylus applications. It should also be noted that the same assembly used for the capacitive sense array 125, which is configured to detect touch objects 140, is also used to detect and track the active stylus 130 without an additional PCB layer for inductively tracking the active stylus 130 as done conventionally.

In the depicted embodiment, the processing device 110 includes analog and/or digital general purpose input/output ("GPIO") ports 107. GPIO ports 107 may be programmable. GPIO ports 107 may be coupled to a Programmable Interconnect and Logic ("PIL"), which acts as an interconnect between GPIO ports 107 and a digital block array of the processing device 110 (not shown). The digital block array may be configured to implement a variety of digital logic circuits (e.g., DACs, digital filters, or digital control systems) using, in one embodiment, configurable user modules ("UMs"). The digital block array may be coupled to a system bus. Processing device 110 may also include memory, such as random access memory ("RAM") 105 and program flash 104. RAM 105 may be static RAM ("SRAM"), and program flash 104 may be a non-volatile storage, which may be used to store firmware (e.g., control algorithms executable by processing core 102 to implement operations described herein). Processing device 110 may also include a memory controller unit ("MemCV") 103 coupled to memory and the processing core 102.

The processing device 110 may also include an analog block array (not shown). The analog block array is also coupled to the system bus. Analog block array also may be configured to implement a variety of analog circuits (e.g., ADCs or analog filters) using, in one embodiment, configurable VMs. The analog block array may also be coupled to the GPIO 107.

As illustrated, capacitance sensor 101 may be integrated into processing device 110. Capacitance sensor 101 may include analog I/O for coupling to an external component, such as capacitive sense array 125, touch-sensor slider (not shown), touch-sensor buttons (not shown), and/or other devices. The capacitance sensor 101 may be configured to measure capacitance using mutual capacitance sensing techniques, self capacitance sensing technique, charge coupling techniques or the like. In one embodiment, capacitance sensor 101 operates using a charge accumulation circuit, a capacitance modulation circuit, or other capacitance sensing methods known by those skilled in the art. In an embodiment, the capacitance sensor 101 is of the Cypress TMA-3xx family of touch screen controllers. Alternatively, other capacitance sensors may be used. The mutual capacitive sense arrays, or touch screens, as described herein, may include a transparent, conductive sense array disposed on, in, or under either a visual display itself (e.g. LCD monitor), or a transparent substrate in front of the display. In one embodiment, the transmit (TX) and received (RX) electrodes are configured in rows and columns, respectively. It should be noted that the rows and columns of electrodes can be configured as TX or RX electrodes by the capacitance sensor 101 in any chosen combination. In one embodiment, the TX and RX electrodes of the sense array 125 are configured to operate as a TX and RX electrodes of a mutual capacitive sense array in a first mode to detect touch objects, and to operate as electrodes of a coupled-charge receiver in a second mode to detect a stylus on the same electrodes of the sense array. The stylus, which generates a stylus TX signal when activated, is used to couple charge to the capacitive sense array, instead of measuring a mutual capacitance at an intersection of a RX electrode and a TX electrode (a sense element) as done during mutual capacitance sensing. The capacitance sensor 101 does not use mutual capacitance or self-capacitance sensing to measure capacitances of the sense elements when performing a stylus scan. Rather, the capacitance sensor 101 measures a charge that is capacitively coupled between the sense array 125 and the stylus 130 as described herein. The capacitance associated with the intersection between a TX electrode and an RX electrode can be sensed by selecting every available combination of TX electrode and RX electrode. When a touch object, such as a finger or stylus, approaches the capacitive sense array 125, the object causes a decrease in capacitance affecting some of the electrodes. Thus, the location of the finger on the capacitive sense array 125 can be determined by identifying both the RX electrode having a decreased coupling capacitance between the RX electrode and the TX electrode to which the TX signal was applied at the time the decreased capacitance was measured on the RX electrode. Therefore, by sequentially determining the capacitances associated with the intersection of electrodes, the locations of one or more inputs can be determined. It should be noted that the process can calibrate the sense elements (intersections of RX and TX electrodes) by determining baselines for the sense elements. It should also be noted that interpolation may be used to detect finger position at better resolutions than the row/column pitch as would be appreciated by one of ordinary skill in the art having the benefit of this disclosure. In addition, various types of algorithms (e.g., approximation algorithms, interpolation algorithms, centroid algorithms) may be used to detect the center of the touch as would be appreciated by one of ordinary skill in the art having the benefit of this disclosure.

In an embodiment, the electronic system 100 may also include non-capacitive sense elements 170 coupled to the processing device 110 via bus 171 and GPIO port 107. The non-capacitive sense elements 170 may include buttons, light emitting diodes ("LEDs"), and other user interface devices, such as a mouse, a keyboard, or other functional keys that do not use capacitance sensing. In one embodiment, buses 122, and 171 are embodied in a single bus. Alternatively, these buses may be configured into any combination of one or more separate buses Processing device 110 may include internal oscillator/clocks 106 and communication block ("COM") 108. In another embodiment, the processing device 110 includes a spread spectrum clock (not shown). The oscillator/clocks block 106 provides clock signals to one or more of the components of processing device 110. Communication block 108 may be used to communicate with an external component, such as a host processor 150, via host interface ("I/F") line 151. Alternatively, processing device 110 may also be coupled to embedded controller 160 to communicate with the external components, such as host processor 150. In one embodiment, the processing device 110 is configured to communicate with the embedded controller 160 or the host processor 150 to send and/or receive data.

Processing device 110 may reside on a common carrier substrate such as, for example, an integrated circuit ("IC") die substrate, a multi-chip module substrate, or the like. Alternatively, the components of processing device 110 may be one or more separate integrated circuits and/or discrete components. In one exemplary embodiment, processing device 110 is the Programmable System on a Chip (PSoC®) processing device, developed by Cypress Semiconductor Corporation, San Jose, Calif. Alternatively, processing device 110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of a processing device coupled to a host, but may include a system that measures the capacitance on the sensing device and sends the raw data to a host computer where it is analyzed by an application. In effect, the processing that is done by processing device 110 may also be done in the host.

Capacitance sensor 101 may be integrated into the IC of the processing device 110, or alternatively, in a separate IC. Alternatively, descriptions of capacitance sensor 101 may be generated and compiled for incorporation into other integrated circuits. For example, behavioral level code describing the capacitance sensor 101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout may represent various levels of abstraction to describe capacitance sensor 101.

It should be noted that the components of electronic system 100 may include all the components described above. Alternatively, electronic system 100 may include some of the components described above.

In one embodiment, the electronic system 100 is used in a tablet computer. Alternatively, the electronic device may be used in other applications, such as a notebook computer, a mobile handset, a personal data assistant ("PDA"), a keyboard, a television, a remote control, a monitor, a handheld multi-media device, a handheld media (audio and/or video) player, a handheld gaming device, a signature input device for point of sale transactions, an eBook reader, a smart phone, a global position system ("GPS") device, or a control panel. The embodiments described herein are not limited to touch screens or touch-sensor pads for notebook implementations, but can be used in other capacitive sensing implementations, for example, the sensing device may be a touch-sensor slider (not shown) or touch-sensor buttons (e.g., capacitance sensing buttons). In one embodiment, these sensing devices include one or more capacitive sensors. The operations described herein are not limited to notebook pointer operations, but can include other operations, such as lighting control (dimmer), volume control, graphic equalizer control, speed control, or other control operations requiring gradual or discrete adjustments. It should also be noted that these embodiments of capacitive sensing implementations may be used in conjunction with non-capacitive sensing elements, including but not limited to pick buttons, sliders (ex. display brightness and contrast), scroll-wheels, multi-media control (ex. volume, track advance, etc.) handwriting recognition, and numeric keypad operation.

Figure 2:
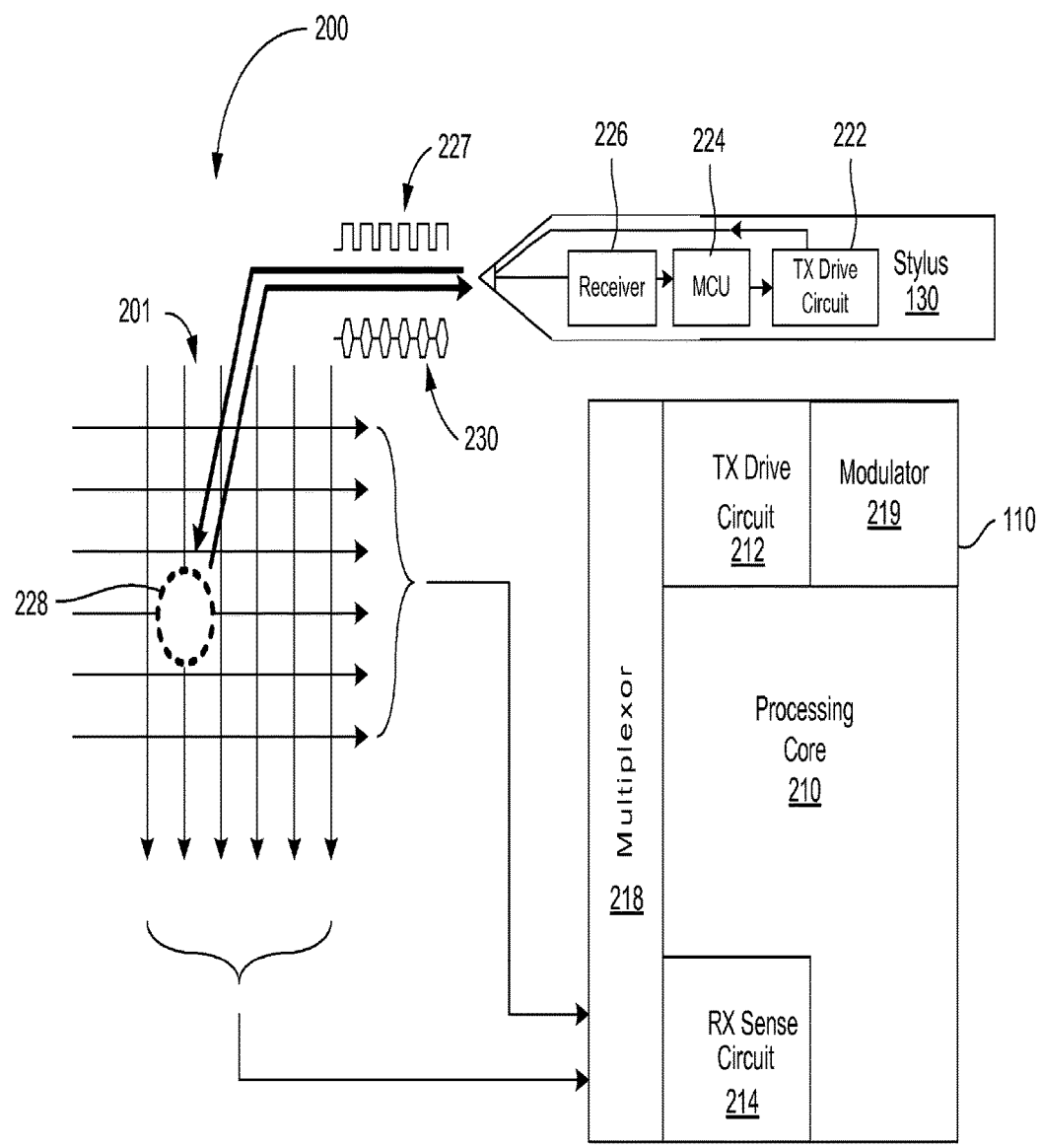
FIG. 2 is a block diagram illustrating one embodiment of a system including a capacitive sense array, a stylus, and a processing device that converts measured signals to touch coordinates.

FIG. 2 is a block diagram illustrating one embodiment of a system 200 including a capacitive sense array 201, a stylus 130, and a processing device 110 that converts measured signals to touch coordinates. The processing device 110 includes a processing core 210, a TX driver circuit 212, a RX sense circuit 214, a multiplexer 218, and a modulator 219. In one embodiment, the processing core 210 is similar to the capacitance sensor 101 described above. The sense array 201 includes multiple electrodes that can be configured as TX electrodes or RX electrodes. For example, in one mode, the TX drive circuit 212 drives a TX signal on a first set of TX electrodes (e.g., the horizontal electrodes), and the RX sense circuit 214 measures signals on a second set of RX electrodes (e.g., the vertical electrodes). In another mode, the TX electrodes are RX electrodes and the RX sense circuit 214 is configured to measure signals on two sets of RX electrodes (e.g., on both the vertical and horizontal electrodes). These sets of RX electrodes can be considered as separate receive channels for stylus signal sensing. It should be noted that TX and RX electrodes are also referred to as TX and RX lines. The multiplexer 218 can be used to connect the TX electrodes or the RX electrodes to the TX drive circuit 212 or the RX sense circuit 214 based on whether the electrodes are being used as RX electrodes or TX electrodes. Although the multiplexer 218 is shown as part of the processing device 110, in other embodiments, the processing device 110 may not include the multiplexer 218. In one embodiment, the system 200 may include multiple sensor arrays. The system may also include individual TX driver circuits and RX sense circuits for each of the multiple sense arrays.

In one embodiment, during normal finger scanning, a passive object (e.g., a finger or other conductive object) touches the sense array 201 at contact point (not illustrated in FIG. 2). The TX drive circuit 212 drives the TX electrodes with a TX signal. The RX sense circuit 214 measures the RX signals on RX electrodes. In an embodiment, the processing core 210 determines the location of contact point based on the mapping techniques as would be appreciated by one of ordinary skill in the art having the benefit of this disclosure. Alternatively, other techniques may be used to determine the contact point. The TX electrodes and RX electrodes are multiplexed by multiplexor 218. The processing core 210 provides the TX signal on the TX electrodes (rows) and measures the capacitance coupling on the RX electrodes (columns). In an embodiment, the TX and RX electrodes are orthogonal and may be used interchangeably (e.g., transmitting on columns and receiving on rows). In an embodiment, the TX drive circuit 212 transmits the TX signal through a high impedance ITO panel (TX electrodes), thus limiting the upper frequency limit and speed of the system. The total scan time may also dependent upon the number of TX electrodes and RX electrodes in the sense array 201. For example, the TX drive circuit 212 provides a TX signal on a single TX electrode and simultaneously reads the capacitively coupled RX signal on a RX electrode, according to one embodiment. In another embodiment, the RX electrodes 640 are multiplexed in two or more scans. In another embodiment, the TX signal may be applied to more than one electrode at the same time.

In one embodiment, during stylus scanning, the stylus TX drive circuit 222 of stylus 130 provides a TX signal 227 directly to contact point 228 on sense array 201, thus eliminating the need to dedicate the second set of RX electrodes (previously TX in finger scanning) to transmitting a TX signal from the TX drive circuit 212. In one embodiment, the active stylus 130 may not directly contact the electrodes in the sense array 201. The active stylus 130 may contact a substrate above the sense array 201 or may contact a substrate on which the sensor array 201 is deposited. The substrate may be a dielectric material. As such, the RX sense circuit 214 measures the RX signal on both the first set of RX electrodes (rows) and a second set of RX electrodes (columns) of sense array 201. This may result in faster position tracking because the TX signal no longer passes through two high impedance ITO electrodes (e.g., passes from a TX electrode to an RX electrode) but instead passes through one high impedance ITO electrode, thus reducing the scan time to the total RX measurement. In one embodiment, during touch object detection (e.g., when detecting a touch object such as a finger), the TX signal passes through a first high impedance ITO electrode (e.g., a TX electrode) and then passes through a second high impedance ITO electrode (e.g., an RX electrode).

The active stylus 130 includes the TX drive circuit 222, a microcontroller (MeU) 224, and a receiver 226. In one embodiment, the processing core 210 performs a normal scan of the sense array 201 during RX sensing of TX signal from the TX drive circuit 212 (described above), and a stylus scan of the sense array 201 during RX sensing of the stylus TX signal 227 (illustrated in FIG. 2). For the stylus scan, the processing core 210 measures a charge being capacitively coupled to the row and column electrodes of the sense array from the stylus. To further illustrate, a mutual capacitance scan uses both a TX and RX signal to track an object. As described above, this is typically done by scanning the RX electrodes for the driven TX electrode in a successive fashion by the processing core 210. In an array of N rows (TX signal) and M columns (RX signal), a complete scan would perform N×M total scans if one RX electrode is sensed at a time. For example, transmitting a TX signal ("TX'ing") on row 1, and receiving a receive signal ("RX-'ing") on columns 1-M, followed by TX'ing on row 2 and RX'ing on columns 1-M, and so on in sequential fashion. Alternatively, more RX electrodes can be sensed at a time. In one embodiment, 4 or 8 RX electrodes are sensed at a time, but in other embodiments, all RX electrodes may be sensed simultaneously or sequentially. With multiple RX channels to sense more than one RX electrode at the same time, the complete scan would be (N*M)/(# RX channels). In contrast, a stylus scan may not use a TX signal by the TX drive circuit 212 and a complete scan would perform a single RX signal measurement on each row and column, or N+M scans, thus resulting in a significantly reduced stylus scanning time for the entire sense array as compared with mutual capacitance scanning time for the entire sense array. Like above, multiple RX channels can be used to sense multiple RX electrodes at the same time. In this case, the complete scan would be (N+M)/(# RX channels).

In one embodiment, the operation of the stylus 130 is synchronized with the operation of the sense array 201. For example, the stylus 130 may not transmit a TX signal when the sense array 201 is performing touch object detection (e.g., transmitting a TX signal on a first set of electrodes and receiving the TX signal on a second set of electrodes). In another example, the sense array 201 may not perform touch object detection and may "listen" or "scan" on all of the electrodes for a TX signal from the stylus 130 when the stylus 130 transmits the TX signal. Synchronizing the operation of the stylus and the sense array 201 may reduce the amount of interference when the sense array 201 detects the TX signal from the stylus 130 and may also reduce the power consumption of the stylus 130 because the stylus 130 may transmit the TX signal at a lower power. Synchronizing the operation of the stylus 130 and the sense array 201 may also provide more flexibility in the management of the stylus and touch object scanning (e.g., allow for different reporting rates for stylus and touch objects under different conditions).

In the depicted embodiment, the TX driver circuit 222 generates a stylus TX signal 227 from the tip of the active stylus 130 into the touch screen. In one embodiment, the MCV may be implemented using a combination of processing logic, state machines, and other circuitry. The processing core 210 senses this signal and resolves this to be the point of the active stylus 130. Synchronization between the processing core 210 sensing and the TX signal 227 generated by the active stylus 130 is used to obtain correct operation. In one embodiment, this synchronization may be performed using one or more of the electrodes of the sense array 201 to transmit a synchronization signal 230 to the active stylus 130. The active stylus 130 may detect (e.g., sense) and demodulate the synchronization signal 230 using receiver 226. The MCV 224 may process the synchronization signal 230 to synchronize the timing of the sensing performed by the processing core 210 and the transmission of the TX signal 227 by the active stylus 130. In one embodiment, the modulator 219 may be used to generate the synchronization signal 230 which is transmitted by the one or more electrodes of the sense array 201.

In one embodiment, the synchronization signal 230 may be transmitted from the one or more electrodes of the sense array 201 to the active stylus 130 by capacitively coupling the one or more electrodes of the sense array 201 to the active stylus 130. In another embodiment, the synchronization signal 230 may have a higher frequency than the TX signal which is also transmitted by the one or more electrodes of the sense array 210. In a further embodiment, the synchronization signal 230 may be a high frequency signal (e.g., a 13.56 megahertz (MHz) on-off keying (OOK) or amplitude shift-keying (ASK) signal). In one embodiment, the frequency range of the synchronization signal 230 may be from 400 KHz to 15 MHz, based on the RC constant of the ITO panel. In one embodiment, the frequency of the synchronization signal 230 may be a frequency which is easily detected by low-cost or low-power circuits. In one embodiment, the frequency of the synchronization signal 230 may be a multiple of the frequency of the TX signal which is also transmitted by the one or more electrodes of the sense array 210. In another embodiment, the frequency of the TX signal transmitted by the one or more electrodes of the sense array 210 may be a multiple of the frequency of the synchronization signal 230. This may reduce the interference experienced by the active stylus 230 when the active stylus 230 receives the TX signal and the synchronization signal 230 transmitted by the one or more electrodes of the sense array 210 (e.g., may improve or increase the signal to noise ration (SNR) of the TX signal and the synchronization signal 230).

In some embodiments, synchronization signal 230 may be transmitted by the one or more electrodes of the sense array 210 in a variety of methods. For example, every other vertical electrode or every other horizontal electrode in the sense array 210 may transmit the synchronization signal 230. In another example, the vertical electrodes may transmit the synchronization signal 230 for a period of time, followed by the horizontal electrodes. In a further example, the synchronization signal may transmitted by the sequentially using the electrodes of the sense array (e.g., the first vertical electrode may transmit the synchronization signal, followed by the second vertical electrode, followed by the third vertical electrode, etc.).

In one embodiment, the operation of the stylus and the host may be synchronized on a cycle by cycle basis. For example, the rising and falling edges of the TX signals transmitted by the host and the stylus may be synchronized (e.g., may be in phase). In another embodiment, the operation of the stylus and the host may be synchronized based on bursts or gaps in the TX signals transmitted by the host and the stylus. For example, the stylus may transmit the stylus TX signal only in the gaps (e.g., time intervals) between the host TX signals.

As described above, a passive stylus may be used as a touch object to interface with the various touch screens described above. In contrast to passive styluses, an active stylus 130 provides the transmit signal 227 (TX signal). This signal 227 may be provided to the active stylus 130 by the processing core 210 as part of the synchronization. The active stylus 130 capacitively couples the stylus TX signal 227 to the sense array 201. In an embodiment, the stylus signal amplitude, frequency, phase, etc., may be the same or similar to that which is utilized for finger sensing by the processing core 210. Alternatively, the stylus TX signal may be different than the TX signal from the TX drive circuit 212, in one or more of amplitude, frequency, and phase. In another embodiment, the stylus TX signal may have a different code for code modulation than a code used in the TX signal from the TX drive circuit 212. In an exemplary embodiment, the stylus TX signal 227 has greater amplitude than the finger sensing TX signal from the TX drive circuit 212. For example, in one exemplary embodiment, the stylus TX signal 227 ranges from approximately 20-50V, as compared with the approximately 5-10V typically provided by the processing core 210. Alternatively, other voltages may be used as would be appreciated by one of ordinary skill in the art. The higher stylus TX voltage couples more charge to the sense array 201 more quickly, thus reducing the amount of time used to sense each row and column of the sense array 201. Other embodiments may incorporate higher voltages on the sense array TX electrodes to obtain similar time efficiency improvements for finger sensing.

In an embodiment, the active stylus 130 applies a higher frequency on the stylus TX signal 227 than the TX signal frequency from TX drive circuit 212 to achieve a reduced sensing time. Charge may be capacitively coupled from the active stylus 130 to the sense array 201 during the rising and falling edges of the stylus TX signal 227. Thus, a higher TX frequency provides a greater number of rising and falling edges over a given period of time, resulting in greater charge coupling. The practical upper limit of the TX frequency in finger sensing mode (e.g., TX signal on sense array 201 for finger sensing) is dependent upon the resistor-capacitor ("RC") time constant of the panel's individual sense elements and interconnect (not shown). This is typically due to high impedance materials (e.g. ITO) used in the fabrication of the sense array 201. A high-impedance sense array (e.g., sense array 201) may result in a high time constant and resulting signal attenuation of the rows (TX electrodes) and columns (RX electrodes) of sense elements, which may limit the maximum sensing frequency. When using an active stylus to transmit the stylus TX signal 227 directly to a contact point 228 on sense array 201, the stylus TX signal 227 does not pass through part of the high impedance path, and therefore the maximum operating frequency for the stylus TX signal 227 can be increased. For example, the time constant of the RX traces (both rows and columns) may be used to determine an upper frequency limit, but this will typically be is at least double the upper frequency limit used in finger sensing. Typically the impedance is half to the impedance when performing mutual capacitance scanning, since the row's impedance is eliminated and the column's impedance remains (or vice versa). In one embodiment, the frequencies used for finger sensing and stylus sensing may be similar, and the upper range for the frequencies may be determined by one or more of the panel RC time constant, driving waveforms, requirements for the panel's resistance to signal interference, and receiver implementation details.

Figure 3:
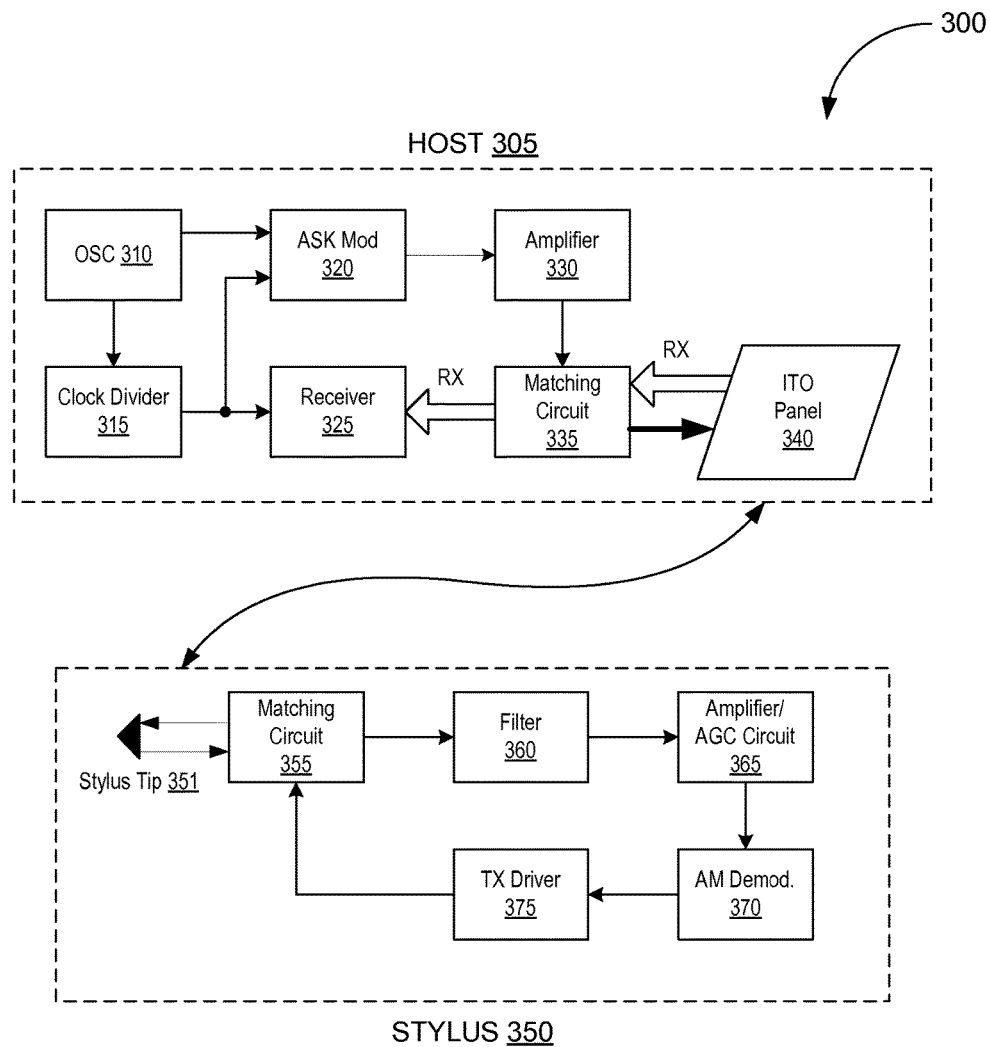
FIG. 3 is a block diagram illustrating one embodiment of a stylus configured to synchronize to a host.

Although the electrodes (e.g., lines) appear as lines in FIG. 2, these electrodes may represent bars or elongated rectangles or other tessellated shapes such as diamonds, rhomboids, and chevrons. Alternatively, other useable shapes may be used as would be appreciated by one of ordinary skill in the art having the benefit of this disclosure FIG. 3 is a block diagram illustrating one embodiment of a stylus 350 configured to synchronize to a host 305.

The host 305 includes an oscillator (OSC) 310, a clock divider 315, an amplitude shift-keying modulator (ASK Mod) 320, a receiver 325, an amplifier 330, a matching circuit 335, and an ITO panel 340. In one embodiment, the OSC 310 may be used to generate a signal with a given frequency, which may be fed to the clock divider 315 to generate a clock signal. The clock signal generated by the OSC 310 and the clock divider 315 may be used to determining the timing of a synchronization signal transmitted by the ITO panel 340 to the stylus 350.

In one embodiment, the ASK Mod 320 may use the clock signal generated by the clock divider 315 to perform an ASK modulation on the signal generated by the OSC 310, in order to generate the synchronization signal which is transmitted by the ITO panel 340 to the stylus 350. Although amplitude shift-keying ("ASK") is described herein, other types of modulation schemes may be used (e.g., frequency shift keying ("FSK"), phase-shift keying ("PSK"), binary phase shift keying ("BPSK")) and would be known by one of ordinary skill in the art. The synchronization signal is provided to the amplifier 330 which amplifies the synchronization signal. The amplified synchronization signal is provided to the matching circuit 335 which provides impedance matching and couples synchronization signal from the from the amplifier 330 to the ITO panel 340 (to the electrodes of the ITO panel 340).

In one embodiment, the ITO panel 340 may also transmit a host TX signal to the stylus 350. In one embodiment, the synchronization signal generated by the OSC 310 and the clock divider 315 may have a higher frequency (e.g., 13.56 MHz) than the host TX signal transmitted by the ITO panel to the stylus 350. In one embodiment, the frequency range of the TX signal may be from 400 KHz to 15 MHz, based on the RC constant of the ITO panel. In one embodiment, the frequency of the TX signal may be a frequency which is easily detected by low-cost or low-power circuits.

In another embodiment, the ITO panel 340 (e.g., the electrodes of the ITO panel 340) may receive a TX signal transmitted by the stylus 350. The TX signal received from the stylus 350 is provided to the matching circuit which provides impedance matching and couples the TX signal received from the stylus 350 to the receiver 325. In one embodiment, the receiver 325 may use the synchronization signal generated by the OSC 310 and the clock divider 315, to determine when the ITO panel 340 should be scanned (e.g., when the electrodes of the ITO panel should be scanned) in order to detect the TX signal from the stylus 350. For example, based on the timing of the synchronization signal (which is transmitted to the stylus 350 via the ITO panel 340), the stylus 350 may only transmit the TX signal during certain time intervals, and the receiver 325 may scan the ITO panel 340 during the same time intervals. In one embodiment, the receiver 325 may provide the TX signal received from the stylus 350 to a processing device (e.g., processing device 110 of FIG. 1) for further processing.

The stylus 350 includes a stylus tip 351, a matching circuit 355, a filter 360, an amplifier/automatic gain control (AGC) circuit 365, an amplitude (AM) demodulator 370, and a transmit (TX) driver 375.

In one embodiment, the stylus tip 351 may receive the synchronization signal transmitted by the ITO panel 340 (e.g., by one or more electrodes of the ITO panel 340). The synchronization signal is provided to the matching circuit 355 which provides impedance matching and couples the synchronization signal to the filter 360. The filter 360 may be used to filter the synchronization signal out from other signals which may be received (e.g., from a TX signal transmitted by one or more electrodes of the ITO panel 340). The synchronization signal is provided to the amplifier/AGC circuit 365 which amplifies the synchronization signal provides an automatic gain control loop to maintain a constant synchronization signal amplitude over a wide-input-signal voltage range. The amplified synchronization signal is provided to the AM demodulator 730 which demodulates the synchronization signal to determine when the stylus 350 should transmit a TX signal. The TX driver 375 may transmit the TX signal to the stylus tip 351 based on the synchronization signal.

Figure 4:
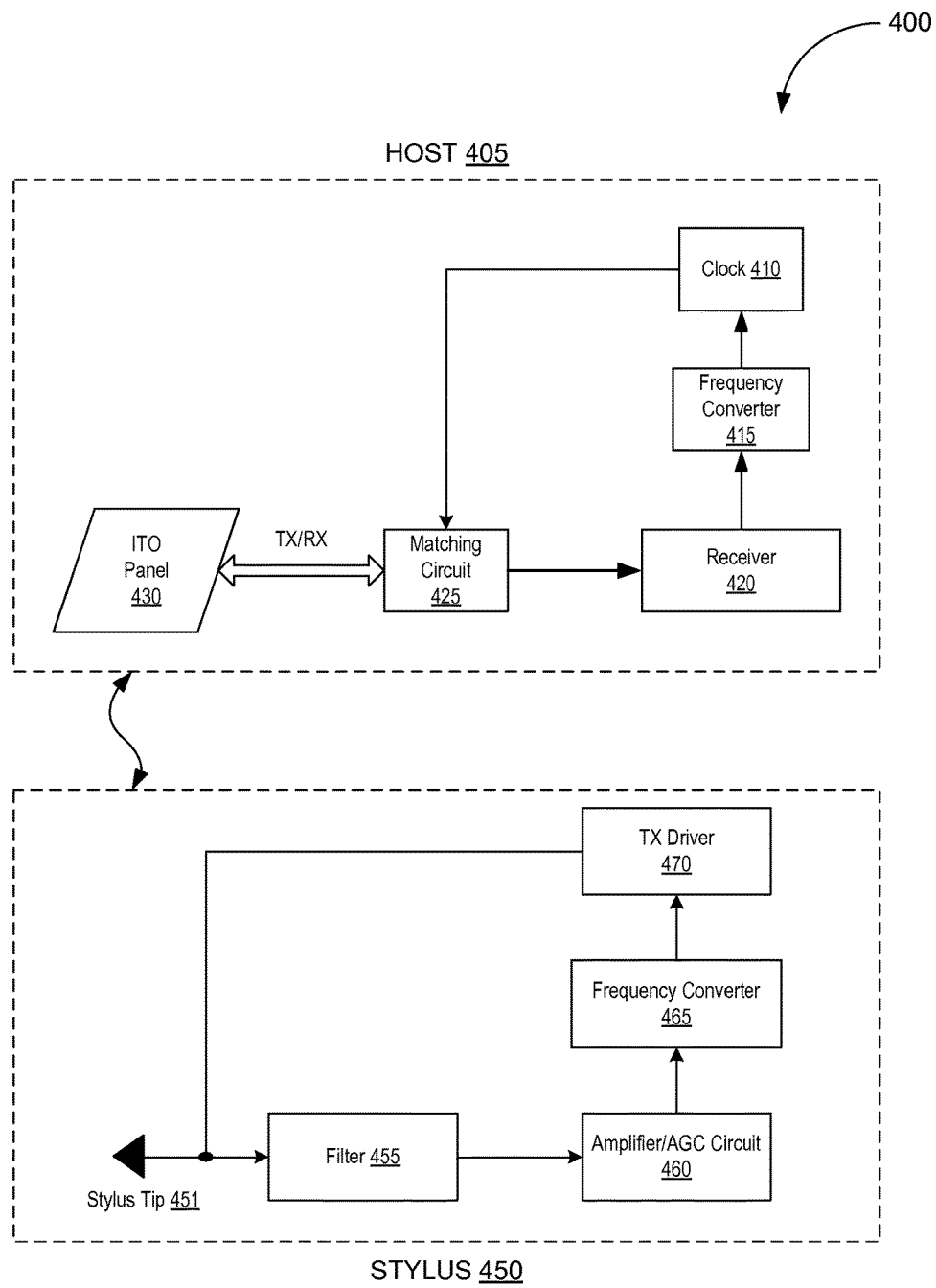
FIG. 4 is a block diagram illustrating another embodiment of a stylus configured to synchronize to a host.

FIG. 4 is a block diagram illustrating another embodiment of a stylus 450 configured to synchronize to a host 405.

The host 405 includes a clock 410, a frequency converter 415, a receiver 420, a matching circuit 425 and an ITO panel 430. The clock 410 may be used to generate a reference signal which may be used to generate a synchronization signal and a host TX signal. The reference signal generated by the clock 410 may be provided to the matching circuit 425 which provides impedance matching for the reference signal and couples the reference signal to the ITO panel 430 as the host TX signal. In one embodiment, the reference signal generated by the clock 410 may also be used to generate a synchronization signal by increasing (e.g., multiplying) or decreasing (e.g., dividing) the frequency of the reference signal to generate the synchronization signal. The reference signal is provided to the frequency converter 415 which increases or decreases the frequency of the reference signal to generate the synchronization signal. In one embodiment, the frequency converter 415 increases or decreases the frequency of the reference signal and also maintains the phase relation between the reference signal and the synchronization signal. The synchronization signal is provided to the receiver 420, which uses the synchronization signal to determine when to scan the ITO panel 430 for a TX signal from the stylus 450. In one embodiment, the matching circuit 425 may also mix the synchronization signal and the host TX signal when the two signals are transmitted to the stylus 450. In another embodiment, the receiver 420 may be a narrow band receiver that is capable of differentiating between (e.g., separating) the reference signal and a TX signal received from the stylus 450.

In one embodiment, the frequency of the host TX signal may be a multiple of the frequency of the synchronization signal. In another embodiment, the frequency of the synchronization signal may be a multiple of the host TX signal. Because the frequency of the host TX signal is a multiple of the synchronization signal, or vice versa, the interference in the signals (e.g., the synchronization signal or the host TX signal) received by the stylus 450 is reduced. This may increase the SNR of the signals received by the stylus 450 and may increase the ability of the stylus 450 to receive the signals transmitted by the ITO panel 430.

The stylus 450 includes a stylus tip 451, a filter 455, an amplifier/AGC circuit 460, a frequency converter 465, and a TX driver 470. The stylus tip 451 may receive the signals (e.g., a host TX signal and a synchronization signal) from the ITO panel 430. The signals are passed to a filter where the synchronization signal is filtered out from other signals received form the ITO panel 430. The synchronization signal is provided to the amplifier/AGC circuit 460 which amplifies the synchronization signal provides an automatic gain control loop to maintain a constant synchronization signal amplitude over a wide-input-signal voltage range. The amplified synchronization signal is provided to the frequency converter 465 which increases or decreases the frequency of the synchronization signal to obtain a TX signal. In one embodiment, the frequency converters 415 and 465 may operate in an identical manner (e.g., both frequency shifters 415 and 465 increase or decrease the frequency of a signal by the same amount). The TX signal is provided to the TX driver 470 which provides the TX signal to the stylus tip 451.

Figure 5:
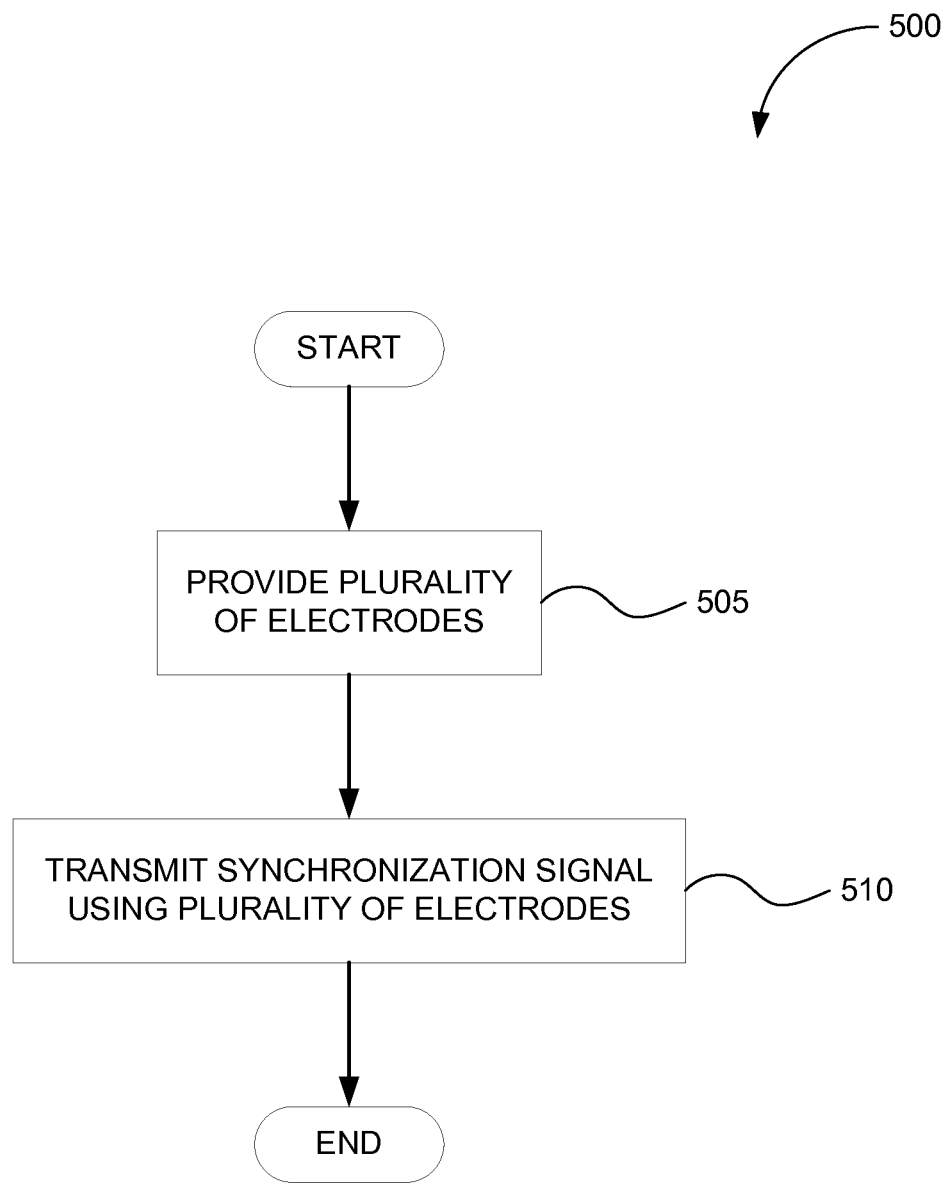
FIG. 5 is a flow chart of one embodiment of a method of synchronizing a stylus to a host.

FIG. 5 is a flow chart of one embodiment of a method 500 of synchronizing a stylus to a host. The method 500 may be performed by a host that comprises hardware (e.g., circuitry, electrodes, switches, dedicated logic, programmable logic, microcode), software (e.g., instructions run on a processing device to perform hardware simulation), or a combination thereof. In one embodiment, method 500 may be performed by processing device 110 as shown in FIG. 1.

The method 500 begins with the host device providing a plurality of electrodes in a capacitive sense array (block 505). In one embodiment, the plurality of electrodes may be part of an ITO panel or a touch screen. At block 510, a synchronization signal is transmitted to a stylus using the plurality of electrodes. Any combination or sequence of the plurality of electrodes may be used to transmit the synchronization signal, as discussed above in conjunction with FIG. 2. In one embodiment, the frequency of the synchronization signal may be different from the frequency of a host TX signal, which may also be transmitted using the plurality of electrodes. In another embodiment, the frequency of the synchronization signal may be higher than the frequency of the host TX signal. In a further embodiment, the frequency of the synchronization signal may be lower than the frequency of the host TX signal.

Figure 6:
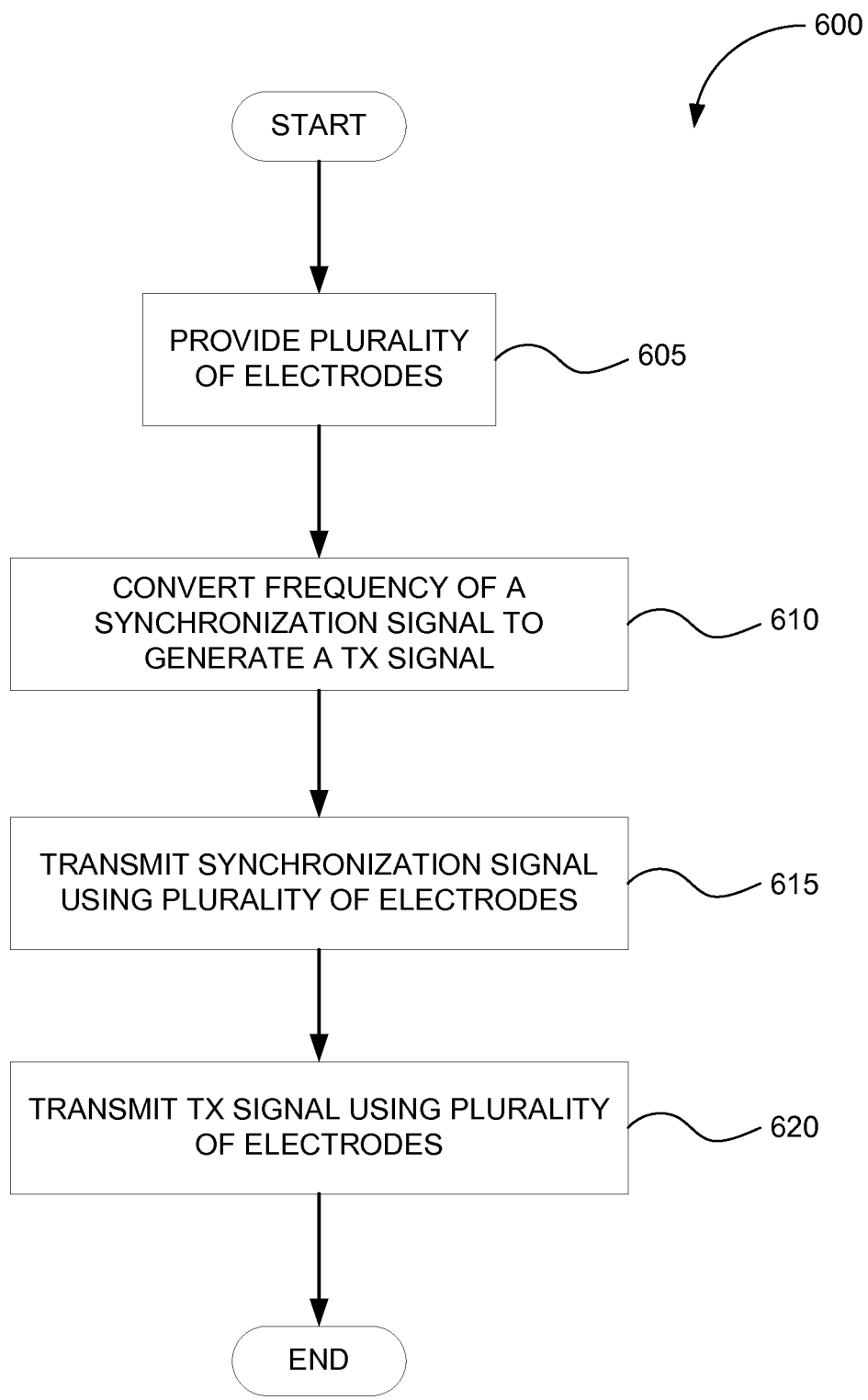
FIG. 6 is a flow chart of another embodiment of a method of synchronizing a stylus to a host.

FIG. 6 is a flow chart of another embodiment of a method of synchronizing a stylus to a host. The method 600 may be performed by a host that comprises hardware (e.g., circuitry, electrodes, switches, dedicated logic, programmable logic, microcode), software (e.g., instructions run on a processing device to perform hardware simulation), or a combination thereof. In one embodiment, method 600 may be performed by processing device 110 as shown in FIG. 1.

The method 600 begins with the host device providing a plurality of electrodes in a capacitive sense array (block 605). In one embodiment, the plurality of electrodes may be part of an ITO panel or a touch screen. At block 610, the frequency of the synchronization signal is converted (e.g., increased, decreased, multiplied and/or divided) to generate a TX signal. In one embodiment, the frequency of the synchronization signal is a multiple of the frequency of TX signal. In another embodiment, the frequency of TX signal is a multiple of the frequency of the synchronization signal. The synchronization signal is transmitted to a stylus using the plurality of electrodes at block 615. Any combination or sequence of the plurality of electrodes may be used to transmit the synchronization signal, as discussed above in conjunction with FIG. 2. At block 620, a TX signal is transmitted using the plurality of electrodes.

Figure 7:
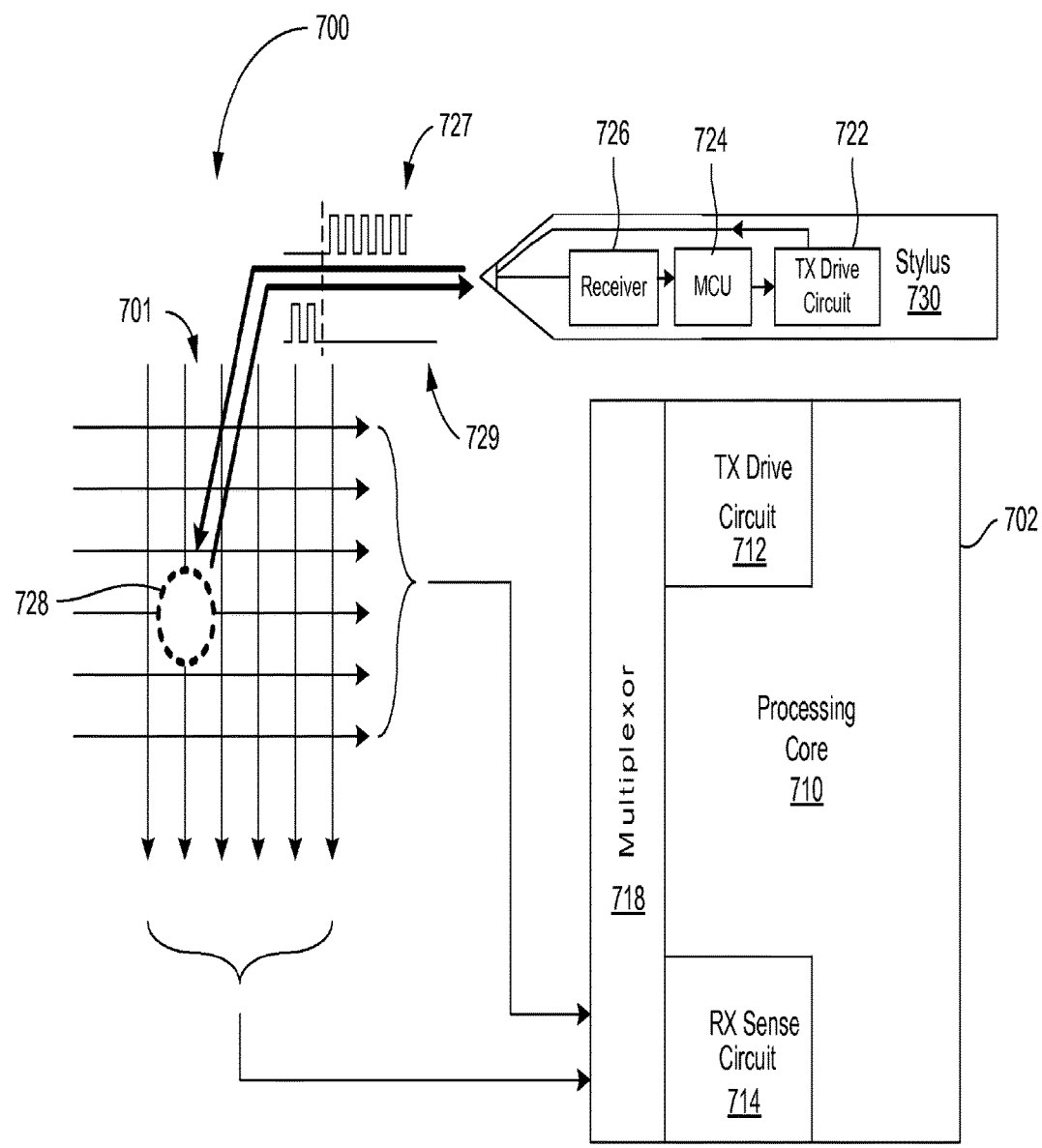
FIG. 7 is a block diagram illustrating a further embodiment of a system including a capacitive sense array, a stylus, and a processing device that converts measured signals to touch coordinates.

FIG. 7 is a block diagram illustrating a further embodiment of a system 700 including a capacitive sense array 701, a stylus 730, and a processing device 702 that converts measured signals to touch coordinates. The processing device 702 includes a processing core 710, a TX driver circuit 712 a RX sense circuit 714, and a multiplexer 718. In one embodiment, the TX driver circuit 712, the RX sense circuit 714 and the multiplexer 718 may perform functions similar to the TX driver circuit 212, the RX sense circuit 214 and the multiplexer 218 of the processing device 110 in FIG. 2.

The processing core 710 may also perform functions similar to the processing core 210 of the processing device 110 in FIG. 2. In one embodiment, the processing core 710 may control the timing of a host TX signal which is transmitted using electrodes (e.g., electrodes) in capacitive sense array 701. The processing core 710 may cause one or more electrodes of the capacitive sense array 701 to transmit (e.g., the processing core 710 may generate) a host TX signal at certain time intervals (e.g., may transmit a synchronization burst 729). In one embodiment, the frequency of the synchronization burst 729 may be identical to the frequency of the host TX signal to one or more electrodes in the capacitive sense array 701 may normally transmit. In another embodiment, the frequency of the synchronization burst 729 may be different from the frequency of the host TX signal to one or more electrodes in the capacitive sense array 701 may normally transmit. In one embodiment, the synchronization burst 729 may also carry or include other data (which may be transmitted to the stylus 730 via the synchronization burst 729) including but not limited to configuration data, power management commands, user feed back commands (e.g., a command to blink a light emitting diode (LED)), data packets, or other additional functionality encoded by the host onto the synchronization burst 729.

The stylus 730 includes a receiver 726, an MeV 724, and a TX driver circuit 722. The receiver 726 may detect the synchronization burst 729 and may provide the synchronization burst 729 to the MeV 724. The MeV 724 may process the synchronization burst 729 to synchronize the operation of the stylus with the host 705. In one embodiment, the synchronization burst 729 may be a synchronization signal. Based on the synchronization burst 729, the MeV 724 may generate a TX signal and provide the TX signal to the TX drive circuit 722 after the synchronization burst 729 ends (as shown in FIG. 7). The TX drive circuit 722 may provide the TX signal to the tip of the stylus which provides a TX signal 727 directly to contact point 728 on sense array 701 (e.g., by capacitively coupling the host 705 and the stylus 730). In one embodiment, the synchronization burst 729 may be used to determine one or more of the timing of the TX signal 227, the frequency of the TX signal 727, the phase of the TX signal 727. In one embodiment, such information may be encoded into the synchronization burst 729 such that the stylus 730 transmits a TX signal 727 of substantially the same phase and frequency as that of the synchronization burst 729, at a time from either the start or the end of the synchronization burst 729. In another embodiment, the any combination of the frequency, timing, and phase of the TX signal 727 may be calculated from data encoded in the synchronization burst 729.

Figure 8:
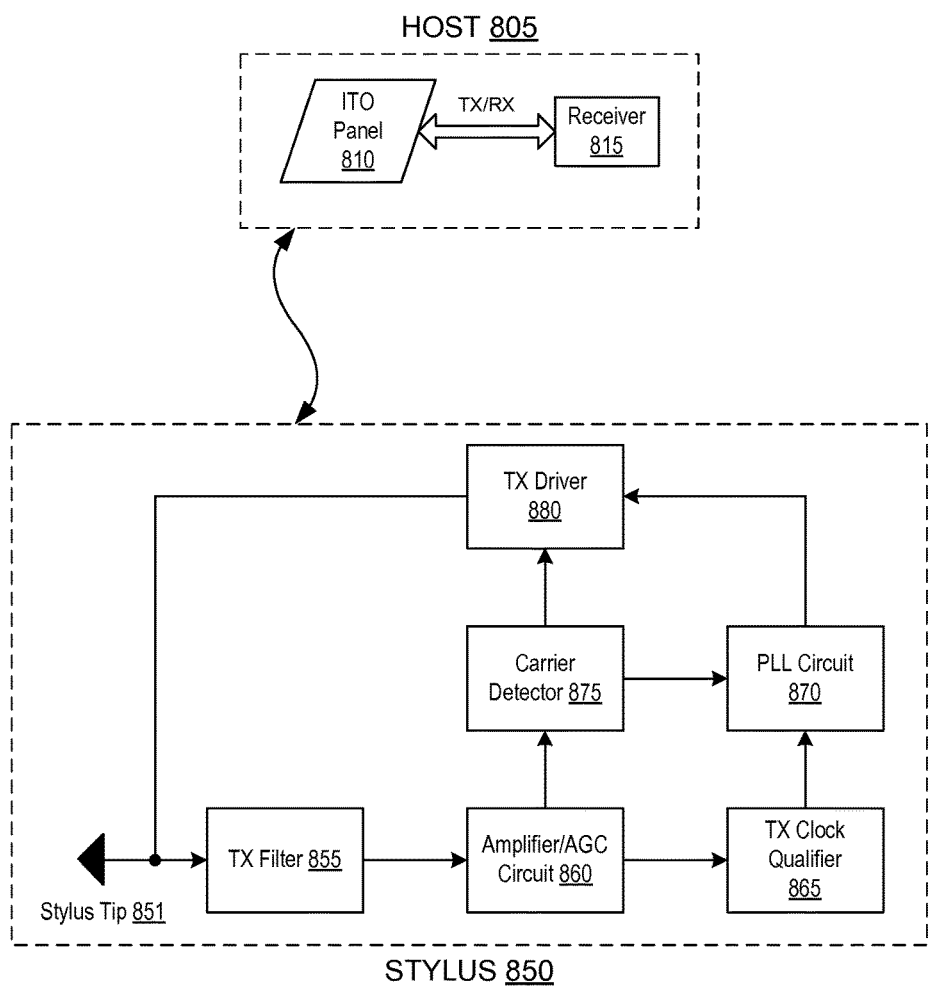
FIG. 8 is a block diagram illustrating yet another embodiment of a stylus configured to synchronize to a host.

FIG. 8 is a block diagram 800 illustrating yet another embodiment of a stylus 850 configured to synchronize to a host 805. The host 805 includes an ITO panel 810 and a receiver 815. In one embodiment, the ITO panel 810 may transmit a synchronization burst using one or more electrodes (e.g., electrodes) of the ITO panel 810. As discussed above, the synchronization burst may include other data. The ITO panel 810 may also receive a TX signal from the stylus 850 (via capacitive coupling with the stylus 850) and may provide this TX signal to the receiver 815. The receiver 815 may filter, amplify, or otherwise process the TX signal and may provide the processed TX signal to a processing device in order to determine a location of contact point between the stylus 850 and the ITO panel 810.

The stylus 850 includes a stylus tip 851, a TX filter 855, an amplifier/AGC circuit 860, a TX clock qualifier 865, a phase-locked loop (PLL) circuit 870, a carrier detector 875, and a TX driver 880. In one embodiment, the functions of some of the circuits shown in FIG. 8 may be performed by an MCV, rather than a dedicated circuit or component. The stylus tip 851 may receive signals (including a synchronization burst) transmitted by one or more electrodes of the ITO panel 810. The synchronization burst may be provided to the TX filter 855 which may initially filter the signal received by the stylus 850. The filtered signal is provided to the amplifier/AC circuit 860 which amplifies the filtered signal and provides an automatic gain control loop to maintain a constant synchronization signal amplitude over a wide-input-signal voltage range. The amplified signal is provided to the carrier detector 875 which may process the signal to determine if the amplified signal includes additional data (e.g., force data, button data, etc.). The additional data may be provided to the TX driver 880 which may use the additional data when providing the stylus TX signal to the stylus tip 851.

The amplified signal is also provided to the TX clock qualifier 865. The TX clock qualifier 865 will filter out the synchronization burst from the amplified signal and provides the synchronization burst to the PLL circuit 870. The PLL circuit 870 may be used to synchronize the operation of the stylus 850 to the timing of the synchronization burst. As discussed above, the PLL circuit 870 may synchronize the operation of the stylus 850 to the host 805 on a cycle by cycle basis. The PLL 870 generates a stylus TX signal (which is synchronized to the synchronization burst) to the TX driver 880 which provides (e.g., drives) the stylus TX signal to the stylus tip 851. In one embodiment, the PLL 870 may be a digital PLL implemented at least partially in firmware on an MCV.

Figure 9:
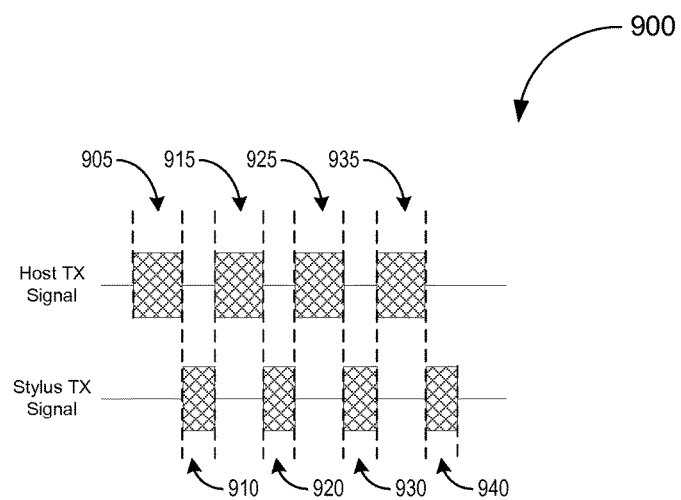
FIG. 9 is a timing diagram illustrating an embodiment of a synchronization between a stylus and a host.

FIG. 9 is a timing diagram 900 illustrating an embodiment of a synchronization between a stylus and a host. The timing diagram 900 includes a host TX signal and a stylus TX signal. As shown in FIG. 9, the host TX signal is transmitted during time intervals 905, 915, 925, and 935 (e.g., the host TX signal is transmitted in bursts). The gaps between the time intervals 905, 915, 925, and 935 are shown as time intervals 910, 920, 930, and 940. The stylus TX signal is transmitted during the time intervals 910, 920, 930, and 940 (e.g., in between the gaps of the host TX signal).

As discussed above, a processing device may be used to detect the presence of a touch object and a stylus on a capacitive sense array (e.g., on an ITO panel). When detecting the presence of a touch object (e.g., of a finger), the capacitive sense array may transmit the host TX signal on one set of electrodes (e.g., vertical electrodes) and may receive the host TX signal on a different set of electrodes (e.g., horizontal electrodes). When detecting a stylus, the capacitive sense array may use all of the electrodes in the capacitive sense array as RX sensors to detect the stylus TX signal. Synchronizing the transmissions of the host TX signal (used to detect a touch object) and the stylus TX signal (used to detect the stylus) allows both touch object and the stylus to be used simultaneously on the capacitive sense array.

In one embodiment, the stylus may listen or detect the host TX signal to determine the time intervals 905, 915, 925, and 935 of the host TX signal. After determining the time intervals 905, 915, 925, and 935 of the host TX signal, the stylus may synchronize its operation to the time intervals 905, 915, 925, and 935 of the host TX signal, such that the stylus transmits the stylus TX signal only within the gaps between time intervals 905, 915, 925, and 935 of the host TX signal (e.g., only within time intervals 910, 920, 930, and 940). In one embodiment, the stylus transmits a stylus TX signal matching the phase and/or frequency of the host TX signal for a pre-determined time after the end of the host TX signal burst is detected.

Figure 10:
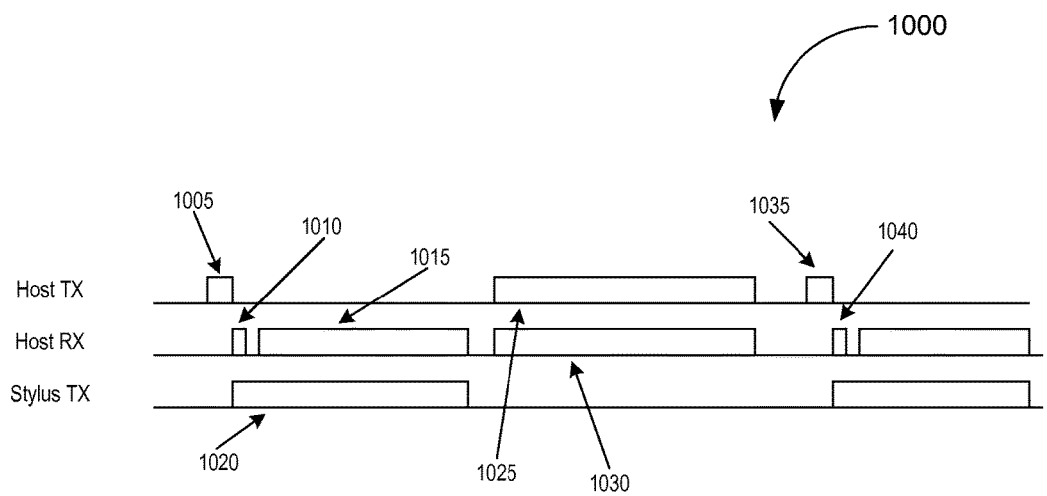
FIG. 10 is a timing diagram illustrating another embodiment of a synchronization between a stylus and a host.

FIG. 10 is a timing diagram 1000 illustrating another embodiment of a synchronization between a stylus and a host. The timing diagram 100 includes a host TX timeline, a stylus TX timeline, and a host RX time line.

As shown in FIG. 10, the host transmits a synchronization burst at time interval 1005. The stylus may detect the synchronization burst transmitted at time interval 1005 and synchronize the operation of the stylus to the host using the synchronization burst (e.g., using the PLL described above to synchronize with the synchronization burst). The stylus may also transmit a stylus TX signal after the synchronization burst ends at time interval 1020. The host may listen (e.g., detect) the stylus TX signal at time interval 1010, to confirm that a stylus is present on the capacitive sense array. After confirming that the stylus is present on the capacitive sense array, the host will listen (e.g., detect) on one or more of the rows and columns of electrodes in the capacitive sense array for the stylus TX signal at time interval 1015.

In one embodiment, the host may transmit a host TX signal on a first set of electrodes at time interval 1025 and may receive or detect the host TX signal on a second set of electrodes at time interval 1030 (e.g., may perform touch object detection). At time interval 1035, the host TX timeline, a stylus TX timeline, and a host RX timeline may restart such the host again transmits a synchronization burst at time interval 1035 and the host again listens (e.g., scans the RX electrodes) for a stylus TX signal at time interval 1040.

Figure 11:
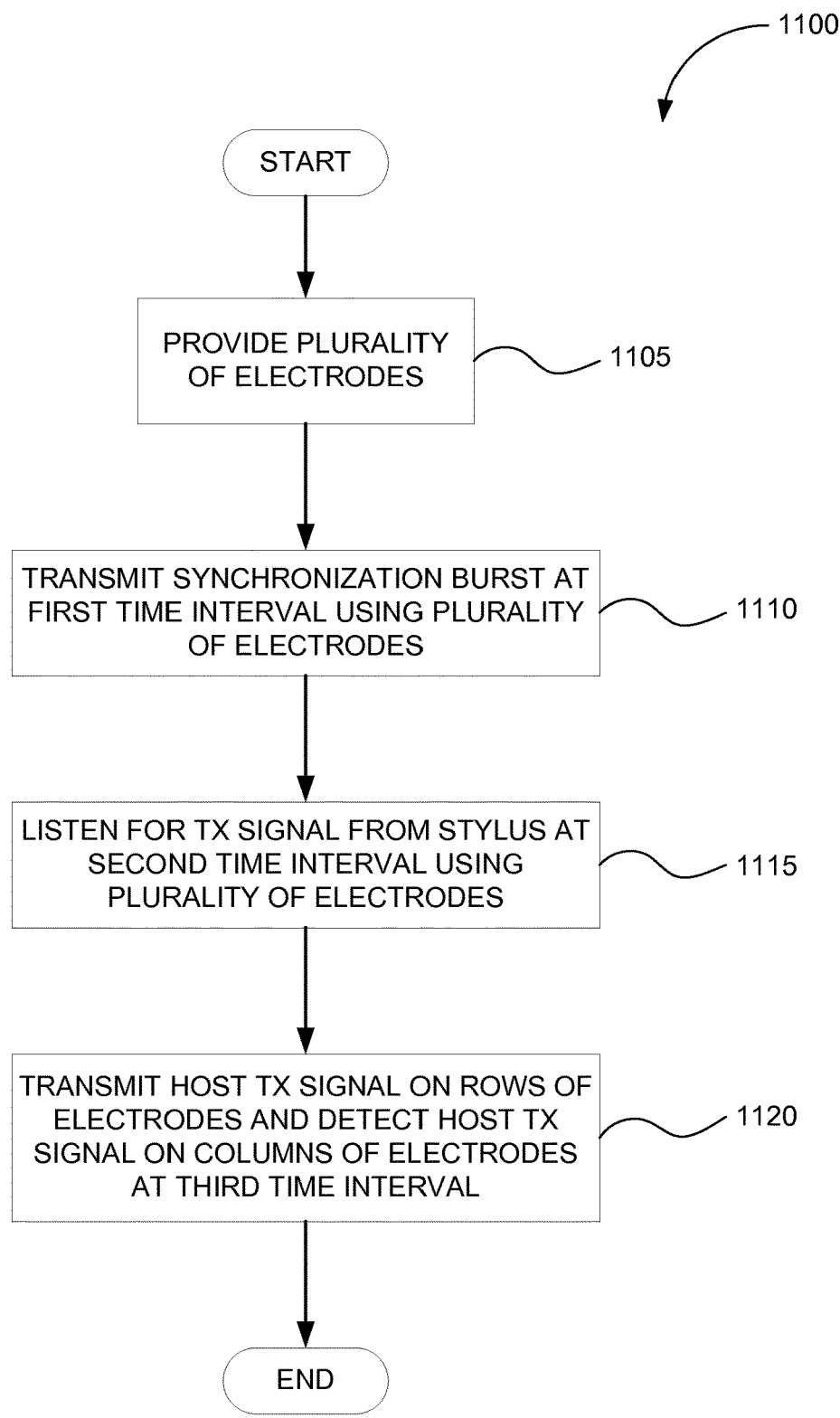
FIG. 11 is a flow chart of a further embodiment of a method of synchronizing a stylus to a host.

FIG. 11 is a flow chart of a further embodiment of a method 1100 of synchronizing a stylus to a host. The method 1100 may be performed by a host that comprises hardware (e.g., circuitry, electrodes, switches, dedicated logic, programmable logic, microcode), software (e.g., instructions run on a processing device to perform hardware simulation), or a combination thereof. In one embodiment, method 1100 may be performed by processing device 702 as shown in FIG. 7.

The method 1100 begins with the host device providing a plurality of electrodes in a capacitive sense array (block 1105). In one embodiment, the plurality of electrodes may be part of an ITO panel or a touch screen. At block 1110, a synchronization burst is transmitted to a stylus at a first time interval, using the plurality of electrodes. Any combination or sequence of the plurality of electrodes may be used to transmit the synchronization signal, as discussed above in conjunction with FIG. 2. In one embodiment, the frequency of the synchronization burst may the same as the frequency of a TX signal which may be transmitted by the host device. The host device listens (e.g., scans or detects) for a stylus TX signal at a second time interval using the plurality of electrodes at block 1115 (e.g., touch object detection). At block 1120, the host device transmits a host TX signal using the rows of electrodes and detects the host TX signal using the columns of electrodes at a third time interval. In one embodiment, the host device may transmit the host TX signal using the columns of electrodes and may detect the host TX signal using the rows of electrodes.

The embodiments described herein describe various aspects of stylus to host synchronization methods. In one embodiment, a synchronization signal may be transmitted to a stylus using one or more electrodes in a capacitive sense array. The one or more electrodes are also used to transmit a host TX signal. In another embodiment, the one or more electrodes may transmit a synchronization burst (e.g., transmit a signal for a period of time) and the stylus may synchronize its operation to the host by listening or detecting the synchronization burst. Some of the embodiments described herein allow a stylus to synchronize its operation to the host without using an antennae (e.g., without using a radio frequency (RF) antennae or a magnetic antennae).

In one embodiment, the synchronization signal is capacitively coupled to a stylus from the sense array of a host device, rather than transmitted using a wireless signal, such as an RF signal. In another embodiment, the host device may be classified as an unintentional radiator (e.g., a device which does not intentionally transmit RF). Because the host device may be classified as an unintentional radio, the host device may be subject to fewer certification requirements (as compared to devices which intentionally radiate or transmit RF) which may decrease the development costs and development times of the host device.

Embodiments of the present invention, described herein, include various operations. These operations may be performed by hardware components, software, firmware, or a combination thereof. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other types of mediums.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the methods) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

The invention claimed is:

1. A signal processing device configured to be coupled to a sensor array including first electrodes extending in a first direction and second electrodes extending in a second direction different from the first direction, the signal processing device comprising:
a signal generator configured to generate a first sensor transmission signal and a second sensor transmission signal, wherein a frequency of the first sensor transmission signal is greater than a frequency of the second sensor transmission signal, and the second sensor transmission signal is usable for sensing a passive object on the sensor array; and
a processor coupled to the signal generator and configured to:
transmit the first sensor transmission signal capacitively via the sensor array to an active stylus, wherein the first sensor transmission signal allows the active stylus to determine when to transmit a stylus transmission signal to the sensor array;
determine whether the active stylus is present on the sensor array based on the stylus transmission signal, which is capacitively received by the sensor array in a first time period and is distinguishable from the first sensor transmission signal; and
after determining that the active stylus is present on the sensor array, detect a position of the active stylus on the sensor array based on the stylus transmission signal capacitively received by the sensor array in a second time period subsequent to and different from the first time period.

2. The signal processing device of claim 1, wherein the processor time-divisionally transmits the first sensor transmission signal and the second sensor transmission signal.

3. The signal processing device of claim 1, wherein the processor time-overlappingly transmits the first sensor transmission signal and the second sensor transmission signal.

4. The signal processing device of claim 1, wherein the first sensor transmission signal includes a power management command for the active stylus.

5. The signal processing device of claim 1, wherein the first sensor transmission signal includes a user feedback command for the active stylus.

6. The signal processing device of claim 5, wherein the user feedback command is a command that controls an LED provided on the active stylus.

7. The signal processing device of claim 1, wherein the first sensor transmission signal includes a data packet.

8. The signal processing device of claim 1, wherein the first sensor transmission signal defines a frequency of the stylus transmission signal.

9. The signal processing device of claim 1, wherein the first sensor transmission signal includes configuration data that configures the active stylus.

10. An active stylus configured to indicate a position on a sensor array including first electrodes extending in a first direction and second electrodes extending in a second direction different from the first direction, the active stylus comprising:
signal reception circuitry which, in operation, capacitively receives a first sensor transmission signal, from the sensor array and determines when to transmit a stylus transmission signal based on the received first sensor transmission signal; and
signal transmission circuitry which, after the signal reception circuitry receives the first sensor transmission signal, transmits the stylus transmission signal that is distinguishable from the first sensor transmission signal, wherein the stylus transmission signal transmitted in a first time period allows the sensor array to detect a presence of the active stylus and the stylus transmission signal transmitted in a second time period subsequent to and different from the first time period allows the sensor array to detect a position of the active stylus, and
wherein the sensor array transmits a second sensor transmission signal distinguishable from the first sensor transmission signal, a frequency of the first sensor transmission signal being greater than a frequency of the second sensor transmission signal, via the first electrodes of the sensor array in a third time period, and receives signals indicative of a presence of a passive object via the second electrodes of the sensor array in a fourth time period, wherein the third time period overlaps with the fourth time period.

11. The active stylus of claim 10, wherein the first sensor transmission signal includes a power management command for controlling the active stylus.

12. The active stylus of claim 10, wherein the first sensor transmission signal includes a user feedback command for controlling the active stylus.

13. The active stylus of claim 12, wherein the user feedback command is a command that controls an LED provided on the active stylus.

14. The active stylus of claim 10, wherein the first sensor transmission signal defines a frequency of the stylus transmission signal.

15. The active stylus of claim 10, wherein the first sensor transmission signal includes configuration data that configures the active stylus.

16. The active stylus of claim 10, wherein the data included in the stylus transmission signal includes at least one of stylus force data and stylus button data.

17. The active stylus of claim 10, wherein the stylus transmission signal includes data.

* * * * *